United States Patent [19]

Yokoyama et al.

[11] Patent Number: 5,042,031
[45] Date of Patent: Aug. 20, 1991

[54] DOUBLE LOOP COMMUNICATIONS CONTROL SYSTEM

[75] Inventors: Yukio Yokoyama; Tatsuki Ichihashi, both of Kanagawa, Japan

[73] Assignee: Mitsubishi Denki Kabushiki Kaisha, Tokyo, Japan

[21] Appl. No.: 505,768

[22] Filed: Apr. 5, 1990

[30] Foreign Application Priority Data

Apr. 7, 1989 [JP] Japan ................................. 1-88762

[51] Int. Cl.$^5$ .............................................. H04J 3/02
[52] U.S. Cl. ................................ 370/85.5; 370/85.12; 370/94.1; 370/60; 370/16; 340/825.05
[58] Field of Search ............... 370/85.12, 85.5, 94.1, 370/60, 16.1, 16, 94.2; 340/825.5, 825.05

[56] References Cited

U.S. PATENT DOCUMENTS

| | | | |
|---|---|---|---|
| 4,569,041 | 2/1986 | Takeuchi et al. ................ | 370/85.12 |
| 4,680,776 | 7/1987 | Ikeuchi et al. ................... | 370/16 |
| 4,713,807 | 12/1987 | Caves et al. ..................... | 370/94.1 |
| 4,819,230 | 4/1989 | Calvignac et al. ............... | 370/94.1 |
| 4,903,261 | 2/1990 | Baran et al. ..................... | 370/94.2 |

Primary Examiner—Douglas W. Olms
Assistant Examiner—Dang Ton
Attorney, Agent, or Firm—Wolf, Greenfield & Sacks

[57] ABSTRACT

A configuration control method for a double loop communications system capable of handling simultaneously two different traffic modes for packet data and circuit-switched data, which includes a selector for connecting a token passing control circuit to either a hybrid multiplexer or a transmission line interface circuit to fully utilize the resources of the double loop transmission lines to increase the system throughput and handle both packet data and circuit-switched data in the event of fault occurrence without increasing the overhead for the fault recovery action.

11 Claims, 4 Drawing Sheets

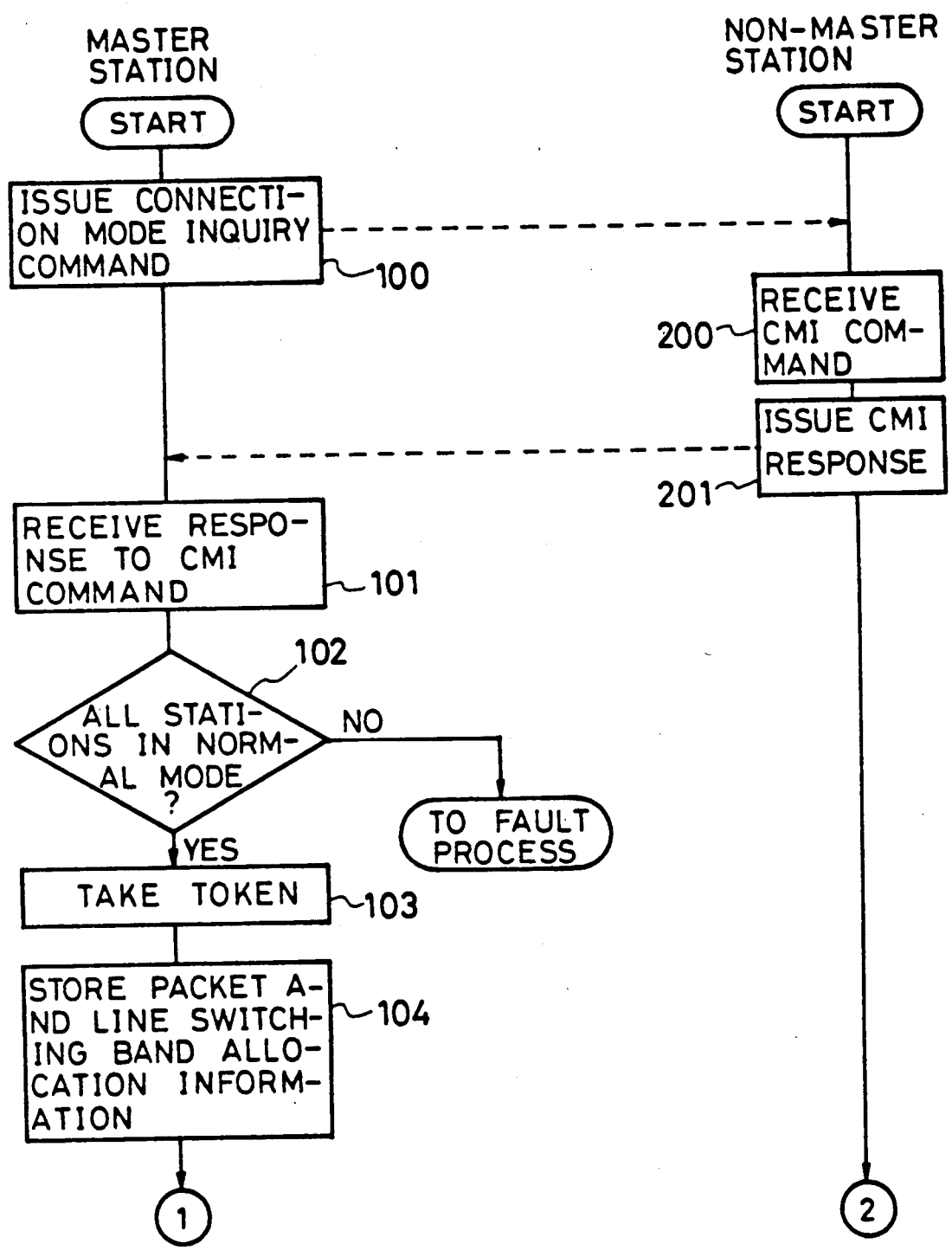

DOUBLE LOOP COMMUNICATIONS CONTROL SYSTEM

BACKGROUND OF THE INVENTION

1. Field of the Invention

The present invention relates to a configuration control method for making use of the redundant loop transmission line of a double loop communications system which is able to handle simultaneously two types of traffic mode, namely, packet-switched data and circuit-switched data.

2. Description of the Prior Art

A double loop communications system using a conventional communications system based on the fiber distributed data interface type II (FDDI-II), which is being standardized by the American National Standards Institute (ANSI), is shown in FIG. 3. The communication system includes the first loop transmission lines 1a, 1b, ..., 1n; the second loop transmission lines 2a, 2b, ..., 2n; and stations 3a, 3b, ..., 3n. Each station 3 includes a first transmission line interface circuit 4 for performing serial/parallel conversion and encoding/decoding of data; and a second transmission line interface circuit 5 having the same function as the interface circuit 4; a hybrid multiplexer 6 for controlling a periodic transmission frame which is transmitted through the loop transmission line at a certain period and separating the packet data and circuit switched data from the periodic transmission frame or multiplexing them; a token passing control circuit 7 for controlling, by token passing access control, transmission or transfer of the packet data in the packet bandwidth selected by the hybrid multiplexer 6; a circuit-switched channel control circuit 8 for controlling circuit switched channel (or transfer of the circuit switched data) in the circuit-switched bandwidth selected by the hybrid multiplexer 6; selectors 9-11 for selecting respective inputs; and signal lines 12-21.

In operation, in the normal operation wherein all the loop transmission lines are available, the serial data inputted via the first loop transmission line 1 is converted into parallel data and decoded by the first transmission line interface circuit 4 and transmitted to the selector 11 via the signal line 12. The signal line 12 is selected in the selector 1 and connected to the signal line 16. The data from the signal line 16 is identified with the control, packet, and circuit-switched bandwidth by the hybrid multiplexer 6. The data stream in the packet bandwidth is transferred to the token passing control circuit 7 via the signal line 18 while the data stream in the circuit-switched bandwidth is transferred to the token passing control circuit 7 via the signal line 18 while the data stream in the circuit-switched bandwidth is transferred to the circuit-switched channel control circuit 8 via the signal line 20.

The data streams sent by the token passing control circuit 7 and the circuit-switched channel control circuit 8, on the other hand, are sent to the hybrid multiplexer circuit 6 via the signal lines 19 and 21, respectively. These two data streams are allocated to predetermined bandwidth in the hybrid multiplexer 6 to form a transmission frame, which is sent onto the signal line 17. The selector 9 connects the signal line 17 to the signal line 13. The first transmission line interface circuit 4 encodes the data stream carried by the signal line 13 and converts it into serial data and sends it to the downstream station via the first loop transmission line 1.

The data carried by the second loop transmission line 2a is sent to the second loop transmission line 2n via the transmission line interface circuit 5, the signal line 14, the selector 10, the signal line 15, and the transmission line interface circuit 5.

The operation in the event of fault occurrence will be described. For example, when a fault occurs on a loop transmission line either 1b or 2b, thus disabling data transfer, the stations 3b and 3c perform loopback control, thereby enabling communications again. A case wherein the loop transmission line 1b is broken will be discussed below. First of all, the transmission line interface circuit 4 of the station 3c detects an input signal interruption. In response to instructions from the control unit (not shown), the selector 11 of the station 3c selects the signal line 14, while the transmission line interface circuit 5 stops sending a signal to the loop transmission line 2b. The transmission line interface circuit 5 of the station 3b then detects an input signal interruption on the loop transmission line 2b. In response to instructions from the control unit, the selector 10 switches from the signal line 14 to select the signal line 17. As a result, the data carried by the loop transmission line 1b is now carried by the loop transmission line 2a.

As has been described above, in normal operation, only one of the double loop transmission lines is used, making it difficult to increase the system throughput. Even if both the loop transmission lines are used for the packet data and the circuit-switched data, respectively, only the packet data is valid in the event of fault occurrence.

SUMMARY OF THE INVENTION

Accordingly, it is an object of the invention to provide a double loop communications control method making use of the double loop transmission resources to increase the system throughput and enable both the packet data and the circuit-switched data transmission without increasing the overhead for the fault recovery action.

In accordance with the invention there is provided a double loop communications control which includes selectors for making a token passing control circuit connectable to either a hybrid multiplexer or a transmission line interface circuit so that when both of the double loop transmission lines are in normal operation, by selection of the selectors, the token passing control circuit is separated from the hybrid multiplexer to make packet data communications with one of the loop transmissions line directly from the token passing control circuit via the transmission line interface circuit, while a periodic transmission frame is formed o the other loop transmission line by the hybrid multiplexer, the circuit-switched channel control circuit, and the transmission line interface circuit to make line switching data communications and when not both of the loop transmission lines are available due to the occurrence of a fault, by selection of the selectors, the token passing control circuit is switched from the transmission line interface circuit to the hybrid multiplexer to merge and transfer packet data and circuit-switched data via a loop transmission line formed by loopback control.

That is, in the normal operation of the double loop transmission lines, by selection of the selectors, the token passing control circuit is connected directly to the transmission line interface circuit to make packet data communications via one of the loop transmission line, while a period transmission frame is formed on the other loop transmission line by the hybrid multiplexer, the circuit-switched channel control circuit, and the transmission line interface circuit to make circuit-switched data communications.

When not both of the loop transmission lines in the event of fault occurrence on the loop transmission line, for example, by selection of the selectors, the token passing control circuit is switched from the transmission line interface circuit to the hybrid multiplexer to merge and transfer packet data and circuit-switched data via a loop transmission line formed by loopback control.

The above and other objects, features, and advantages of the invention will become more apparent from the following description when taken in conjunction with the accompanying drawings.

BRIEF DESCRIPTION OF THE DRAWINGS

FIG. 2A and 2B are flow charts useful for explaining how the control method of FIG. 1 is changed from the normal mode to the extension mode.

DESCRIPTION OF THE PREFERRED EMBODIMENT

Figure 1:
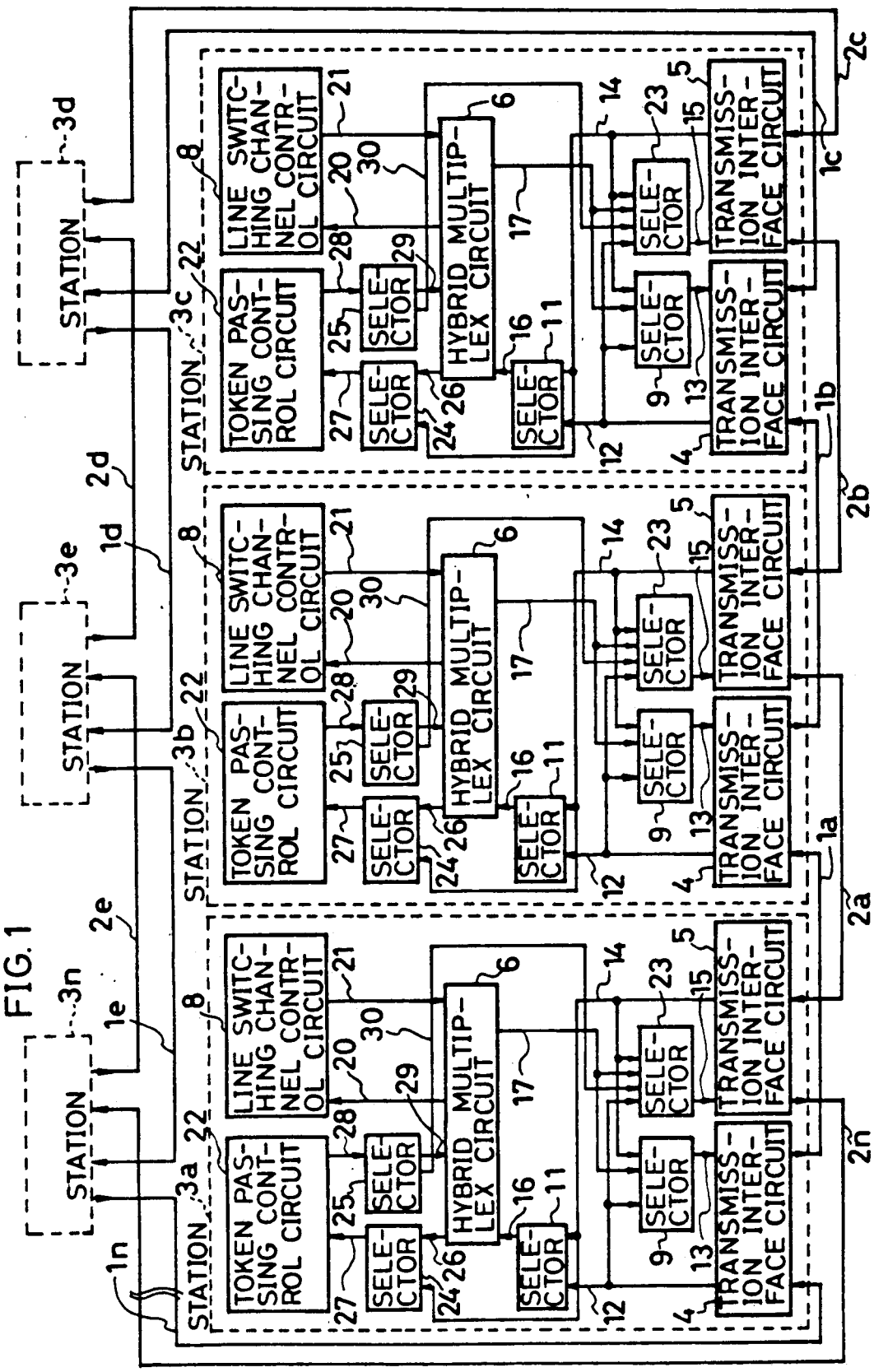
FIG. 1 is a block diagram of a double loop communications system employing a communication control method according to an embodiment of the invention.
Figure 3:
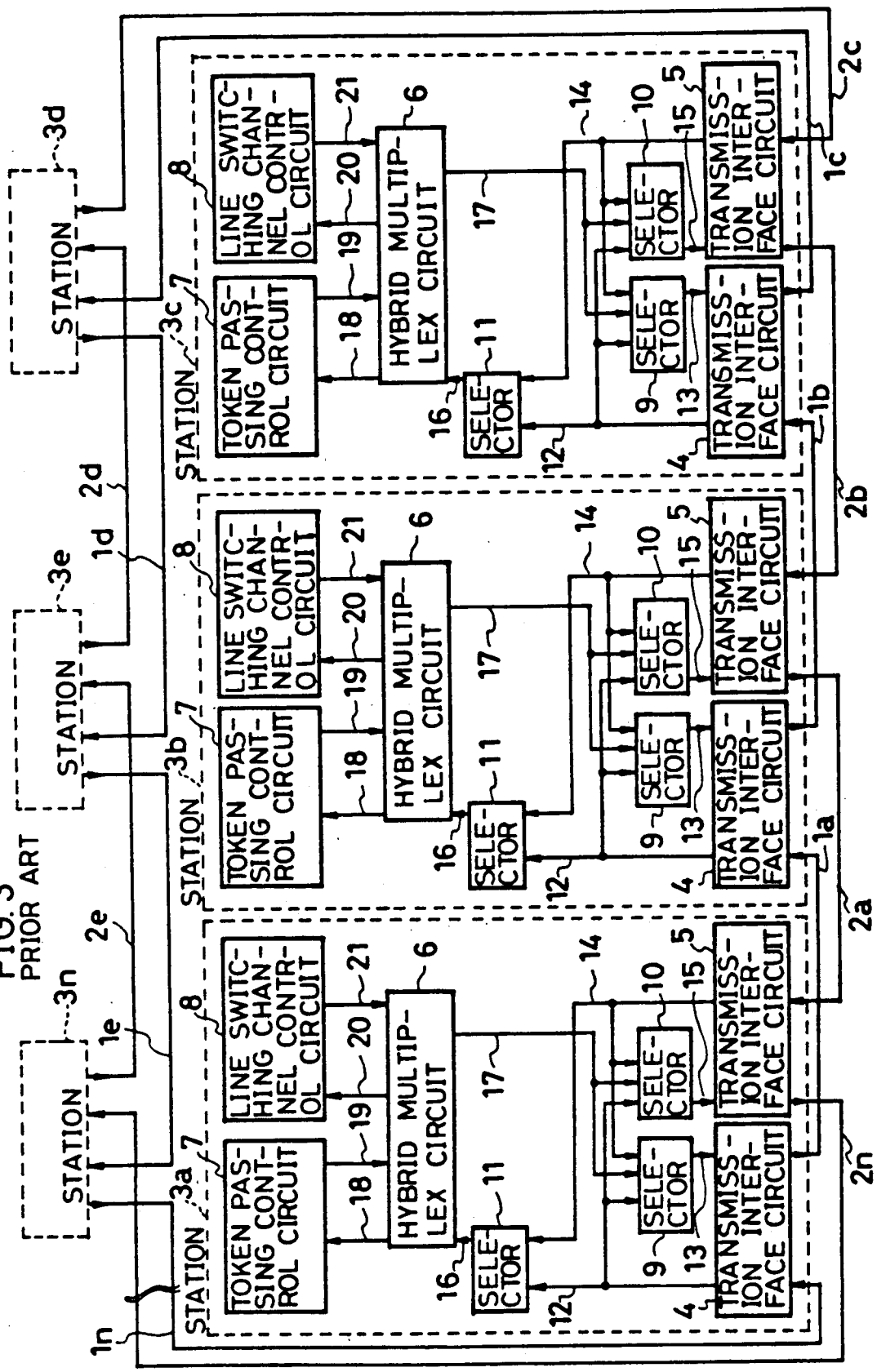
FIG. 3 is a block diagram of a double loop communications system using a conventional communications control method.

In FIG. 1, reference characters 1-21 denote the same parts or components as those in FIG. 3. The token passing control circuit 22 of this system is made connectable to either the hybrid multiplexer 6 or the transmission line interface circuit 5 via various selectors 23-25 and signal lines 26-30.

In operation, this system takes the same configuration as that of the conventional one in the initial stage of normal operation. That is, the selectors 11, 9, and 23 select the signal lines 12, 17 and 14, respectively. Also, the selectors 24 and 25 select the signal lines 26 and 29, respectively. Consequently, both the token passing control circuit 22 and the circuit-switched channel control circuit 8 are connected to the transmission line interface circuit 4 via the hybrid multiplexer 6. Thus, only the first loop transmission line is used to form a periodic transmission frame in which both packet and circuit-switched data are multiplexed for transmission.

Figure 2B:
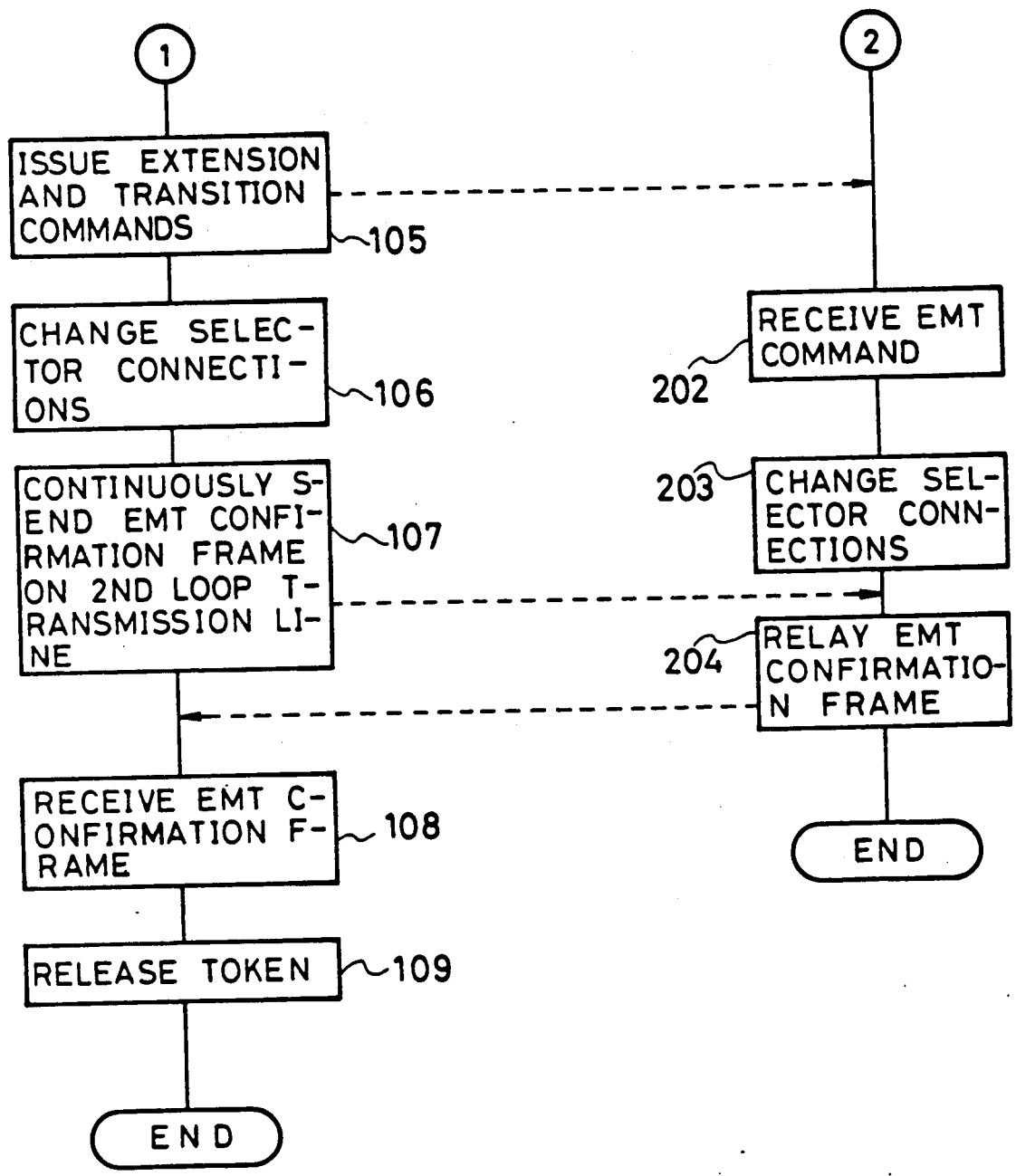

How the above operational mode is changed to the operational mode in which both the first and the second loop transmission lines 1 and 2 are used will be described with reference to FIGS. 2A and 2B. The operational mode in which only one of the double loop transmission lines or a loopback transmission line in the event of fault occurrence is used will be called "normal mode" while the mode in which both the lines are used will be called "extension mode." First of all, a station 3a, which controls the operation and will be called "master station," issues a connection mode inquiry (CMI) command to all the other stations in order to check the operational mode (Step 100). Upon reception of the connection mode inquiry command (Step 200), each station returns its operation mode information to the master station (Step 201). Upon reception of the above response from each station (Step 101), the master station checks if all the stations are in the normal mode (Step 102). If the answer is "No," the system is faulty, and an appropriate fault process is carried out. If the answer is "Yes," the master station captures the token which travels in the packet bandwidth (Step 103). Then, it stores the bandwidth allocation information about the packet data and the circuit-switch data on the periodic transmission frame (Step 104).

Then, the master station issues a command for changing all the stations into the extension mode (Step 105). Upon reception of the command (Step 202), each station changes the line configuration so that the selectors 23, 24, and 25 select the signal lines 30, 1 4, and 30, respectively (Step 203). Similarly, the master station changes the selector connections (Step 106). In order to confirm that the second loop transmission line 2 is established for packet traffic, the master station continuously sends an extension mode transition (EMT) confirmation frame in the form of a packet frame on the second loop transmission line 2 (Step 107). The non-master station relays the frame (Step 204). Upon reception of the frame (Step 108), the master station recognizes that the packet transfer is being carried normally out on the second loop transmission line 2 and releases the token which it has held (Step 109). In this way, the operation in the extension mode starts. The data transfer with the periodic transmission frame is still carried out on the first loop transmission line 1. At this point, the actual data type is only circuit-switched data so that is is possible to allocate circuit-switched data to the bandwidth which has been used for packet data. In the second loop transmission line 2, on the other hand, the token passing control circuit 22 is directly accessed via the transmission line interface circuit 5 to permit packet data communications using the packet frame.

A case where a fault takes place in the extension mode will be described. Similarly to the aforementioned example, it is assumed that the loop transmission line 1b is broken. First, the transmission line interface circuit 4 of the station 3c detects an input signal interruption. In response to the instructions from the control section (not shown), the station 3c makes the selectors 11, 24, and 25 select the signal lines 14, 26, and 29, respectively. At the same time, it makes the transmission line interface circuit 5 stop sending a signal to the loop transmission line 2b. Consequently, the transmission line interface circuit 5 of the station 3b detects an input signal interruption on the loop transmission line 2b. In response to the instructions from the control section, the station 3b makes the selector 23 switch from the signal line 14 to the signal line 17. In addition, it continuously sends a reset pattern—a special control bit pattern which is not used for normal data—to the loop transmission line 2a as a signal for changing to the normal mode. Thus, loopback control is carried out.

Upon reception of the reset pattern, the station 3a makes the selectors 23, 24 and 25 select the signal lines 14, 26, and 29, respectively, to form a loop configuration in the normal mode. At the same time, in response to instructions from the control section, it continuously sends the reset pattern to the loop transmission line 1a. The station 3b, on the other hand, receives the reset pattern via the loop transmission line 1a and stops continuous transmission of the reset pattern to its own transmission line 2a. Similarly, the station 3a recognizes the stop action of the station 3b and stops own transmission to the loop transmission line 1a. Then, it starts transmission of the reset pattern to the loop transmission line 2n and waits for reception of the reset pattern on the loop transmission line 1n which is a response from the station 3n. By repeating the above hand-shaking procedure with the reset patter between adjacent stations, all the stations 3 are changed to the normal mode in sequence to form the loop transmission line 2, whereby both the packet data and the circuit-switched data are merged and transferred. The configuration is the same as the conventional one, and the recovery procedure is carried out in the same way. Consequently, the above system is able to not only provide throughput about twice the conventional one but also reduce the overhead for recovery process in the event of fault occurrence on the loop transmission line.

As has been described above, in extension made when both the lines of a double loop transmission lines are normal the packet data communications is made with one of the loop transmission lines directly from the token passing control circuit via the transmission line interface circuit, while the circuit-switched data communications is made with the other loop transmission line by the hybrid multiplexer, the circuit-switched channel control circuit, and the transmission line interface circuit. When not both of the loop transmission lines are available due to the occurrence of a fault, the token passing control circuit is switched from the transmission line interface circuit to the hybrid multiplexer to merge and transfer the packet data and the circuit-switched data via the loop transmission line formed by loopback control, thereby making use of the double loop transmission lines, reducing the overhead for recovery process in the event of fault occurrence on the loop transmission line, thus providing a fast, reliable double loop communications system.

What is claimed:

1. A double loop communications system including a plurality of stations connected in loop with double transmission lines, each said station comprising:
    a token passing control circuit for transferring packet data by token control;
    a circuit-switched channel control circuit for controlling a channel for transferring circuit-switched data;
    a hybrid multiplexer for multiplexing by time sharing packet data from said token passing control circuit and circuit-switched data from said circuit-switched channel control circuit in a single periodic transmission frame and for demultiplexing such packet and circuit-switched data from such frame;
    a first transmission line interface circuit for exchanging signals between selecting means and said loop;
    a second transmission line interface circuit for exchanging signals between said selecting means and said loop;
    said selecting means, responsive to condition of the loop, for making said token passing control circuit connectable to either said hybrid multiplexer or said first transmission line interface circuit, so that when condition of said loop is proper, said token passing control circuit is separated from said hybrid multiplexer by said selecting means to permit provision of packet data between said token passing control circuit and one of said loop transmission lines via said first transmission line interface circuit while said hybrid multiplexer forms a periodic transmission frame of data from said circuit-switched channel control circuit on the other of said loop transmission lines via said second transmission line interface circuit to permit circuit-switched data communications between stations; and when a fault condition is present on said loop, said token passing control circuit is switched by said selecting means from said first transmission line interface circuit to said hybrid multiplexer to permit merging and transferring of packet data and circuit-switched data via a loop transmission line formed by loopback control.

2. The double loop communication system of claim 1, wherein one of said stations is a master station for controlling two operation modes; namely, a normal mode in which one of said double loop transmission lines or a loopback transmission line due to the occurrence of a fault is used and an extension mode in which both of said double loop transmission lines are used.

3. The double loop communications system of claim 1, wherein said double transmission loop lines consist of a first loop transmission line and a second loop transmission line, which are different from each other in signal propagation direction.

4. A communications control system for double loop communications, which comprises:
    a token control circuit;
    a hybrid multiplexer;
    a first transmission line interface circuit for exchanging signals with a first loop transmission line;
    a second transmission line interface circuit for exchanging signals with a second loop transmission line;
    a first selector for selecting a signal line from the group consisting of a first signal line from said first transmission line interface circuit, a second signal line from said second transmission line interface circuit, and a third signal line from said hybrid multiplexer for connection with a fourth signal line to said first transmission line interface circuit;
    a second selector for selecting either said first signal line or said second signal line for connection with a fifth signal line to said hybrid multiplexer;
    a third selector for selecting either said second signal line or a sixth signal line from said hybrid multiplexer for connection with a seventh signal line to said token control circuit;
    a fourth selector for connecting an eighth signal line from said token passing control circuit to either a ninth signal line to said hybrid multiplexer or a tenth signal line to said second transmission line interface circuit; and
    a fifth selector for selecting a signal line from the group consisting of said first, second, third and tenth signal lines for connection with an eleventh signal line to said second transmission line interface circuit.

5. A double loop communications system including a plurality of stations connected in loop with double transmission lines, each said station comprising; a token passing control circuit for transferring packet data by token control, circuit-switched channel control circuit for controlling a channel for transferring circuit-switched data, a hybrid multiplexer for multiplexing by time sharing packet data from said token passing control circuit and circuit-switched data from said circuit-switched channel control circuit in a single periodic transmission frame, a transmission line interface circuit adapted to be connected to said loop for exchanging signals between said hybrid multiplexer and said loop, and selector means including at least means connected between said token passing control circuit, and said hybrid multiplexer and said transmission line interface circuit, for selectively switching an output of said token passing control circuit between said hybrid multiplexer and said transmission line interface circuit.

6. The double loop communications system of claim 5 wherein said selector means comprises a pair of selectors intercoupling the token passing control circuit and the hybrid multiplexer and transmission line interface circuit.

7. A double loop communications system including a plurality of stations connected in loop with double transmission lines, each said station comprising:
- a token passing control circuit for transferring packet data by token control;
- a circuit-switched channel control circuit for controlling a channel for transferring circuit-switched data;
- a hybrid multiplexer, connected to said circuit-switched channel control, for multiplexing by time sharing packet data from said token passing control circuit and circuit-switched data from said circuit-switched channel control circuit in a single periodic transmission frame;
- a first transmission line interface circuit for exchanging signals between selecting means and said loop;
- a second transmission line interface circuit for exchanging signals between said selecting means and said loop;
- said selecting means for placing said system in a first mode or a second mode, said selecting means comprising first means for selectively connecting said hybrid multiplexer to said first transmission line interface circuit and for selectively connecting said token passing control circuit to said second transmission line interface circuit in the first mode, said selecting means further comprising second means for selectively connecting said token passing control circuit and said first transmission line interface circuit to said hybrid multiplexer in said second mode.

8. The double loop communications system of claim 7, wherein said selecting means further comprises third means for selectively connecting at least said second transmission line interface circuit to said hybrid multiplexer in a third mode of said system.

9. The double loop communications system of claim 7, wherein one of said stations is a master station for controlling said first and second modes; namely, said first mode being an extension mode in which both of said double transmission lines are used, and said second mode being a normal mode in which one of said double transmission lines, or a loopback transmission line due to the occurrence of a fault, is used.

10. The double loop communications system of claim 7, wherein said double transmission lines consist of a first loop transmission line and a second loop transmission line which are different from each other in signal propagation direction.

11. A double loop communication system including a plurality of stations connected in loop with double transmission lines, each said station comprising;
- a token passing control circuit for transferring packet data by token control;
- a circuit-switched channel control circuit for controlling a channel for transferring circuit-switched data;
- a hybrid multiplexer for multiplexing by time sharing packet data from said token passing control circuit and circuit-switched data from said circuit-switched channel control circuit in a single periodic transmission frame and demultiplexing vice versa;
- two transmission line interface circuits for exchanging signals between said hybrid multiplexer and said loop or between said token passing control circuit and said loop;
- selectors, responsive to condition of the loop, for making said token passing control circuit connectable to either said hybrid multiplexer or one of said transmission line interface circuits, so that when condition of said loop is proper, said token passing control circuit is separated from said hybrid multiplexer by said selectors to permit packet data communications among stations through said one of said transmission line circuits and one of said loop transmission lines without said hybrid multiplexer while said hybrid multiplexer forms a periodic transmission frame on the other of said loop transmission lines via the other of said transmission line interface circuits to permit circuit-switched communications between said circuit-switched channel control circuit in a plurality of stations; and when a fault condition is present on said loop, said token passing control circuit is switched by said selectors from said one of said transmission line interface circuits to said hybrid multiplexer to permit merging and transferring of packet data and circuit-switched data via a loop transmission line formed by loopback control.

* * * * *